US012532230B2

(12) United States Patent
Liu

(10) Patent No.: US 12,532,230 B2
(45) Date of Patent: Jan. 20, 2026

(54) METHOD FOR PERFORMING CELL RESELECTION BASED ON BEHAVIOR MODE REFERENCE INFORMATION, TERMINAL AND STORAGE MEDIUM

(71) Applicant: GUANGDONG OPPO MOBILE TELECOMMUNICATIONS CORP., LTD., Dongguan (CN)

(72) Inventor: Jun Liu, Beijing (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 614 days.

(21) Appl. No.: 17/994,939

(22) Filed: Nov. 28, 2022

(65) Prior Publication Data
US 2023/0101811 A1 Mar. 30, 2023

Related U.S. Application Data

(63) Continuation of application No. PCT/CN2021/087050, filed on Apr. 13, 2021.

(30) Foreign Application Priority Data

May 28, 2020 (CN) .......................... 202010468192.4

(51) Int. Cl.
H04W 36/00 (2009.01)
H04W 36/30 (2009.01)

(52) U.S. Cl.
CPC .. *H04W 36/0055* (2013.01); *H04W 36/00835* (2018.08); *H04W 36/008375* (2023.05); *H04W 36/302* (2023.05)

(58) Field of Classification Search
CPC ......... H04W 36/008375; H04W 36/08; H04W 8/08; H04W 36/0061; H04W 36/00835;
(Continued)

(56) References Cited

U.S. PATENT DOCUMENTS

2007/0270149 A1* 11/2007 Yanagihara ......... H04W 36/302
455/436
2009/0022106 A1* 1/2009 Ue .................... H04W 36/0019
370/331
(Continued)

FOREIGN PATENT DOCUMENTS

CN 102123461 A 7/2011
CN 102316542 A 1/2012
(Continued)

OTHER PUBLICATIONS

Huawei. "RAN2 Considerations for Coordinated Multipoint Transmission and Reception", 3GPP TSG-RAN WG2 meeting #65bis R2-092178, Mar. 27, 2009 (Mar. 27, 2009).
(Continued)

*Primary Examiner* — Allahyar Kasraian
(74) *Attorney, Agent, or Firm* — BAYES PLLC

(57) ABSTRACT

A cell selection method includes: in a case where a first dynamic mode cell is reselected from a first static mode cell, behavior mode reference information is acquired; a target behavior mode scheme matching with the first static mode cell, the first dynamic mode cell and the behavior mode reference information is searched from among multiple alternative behavior mode schemes, where each of the multiple alternative behavior mode schemes records a respective cell handover process where a starting cell and an ending cell are cells in a static mode and a middle cell is a cell in a dynamic mode; and in a case where the target behavior mode scheme is searched out, the cell reselection is performed by using the target behavior mode scheme based on the first dynamic mode cell.

20 Claims, 11 Drawing Sheets

(58) Field of Classification Search
CPC ........... H04W 36/324; H04W 36/0055; H04W 36/302
See application file for complete search history.

(56) References Cited

U.S. PATENT DOCUMENTS

| | | | | |
|---|---|---|---|---|
| 2010/0177686 | A1* | 7/2010 | Abeille | H04W 40/36 370/328 |
| 2010/0240391 | A1* | 9/2010 | Povey | G01S 5/14 455/456.1 |
| 2013/0225178 | A1* | 8/2013 | Kojima | H04W 36/008375 455/437 |
| 2013/0244682 | A1 | 9/2013 | Schoenerstedt | |
| 2014/0220984 | A1 | 8/2014 | Mandapaka | |
| 2014/0228029 | A1 | 8/2014 | Wen | |
| 2014/0355565 | A1* | 12/2014 | Hayes | H04W 36/0085 370/331 |
| 2015/0036663 | A1* | 2/2015 | Kilpatrick, II | H04W 36/0085 370/332 |
| 2016/0095000 | A1* | 3/2016 | Duan | H04W 4/029 455/446 |
| 2016/0373994 | A1* | 12/2016 | Yiu | H04W 56/0005 |
| 2017/0311206 | A1 | 10/2017 | Ryoo et al. | |
| 2018/0332532 | A1 | 11/2018 | Johansson et al. | |
| 2019/0082355 | A1 | 3/2019 | Ryoo et al. | |
| 2020/0169935 | A1* | 5/2020 | Lin | H04W 36/00838 |
| 2020/0187070 | A1* | 6/2020 | Wang | H04W 48/18 |
| 2021/0211946 | A1* | 7/2021 | Li | H04W 36/00835 |

FOREIGN PATENT DOCUMENTS

| | | |
|---|---|---|
| CN | 104285470 A | 1/2015 |
| CN | 104469865 A | 3/2015 |
| CN | 105466435 A | 4/2016 |
| CN | 105684517 A | 6/2016 |
| CN | 107079305 A | 8/2017 |
| CN | 108076488 A | 5/2018 |
| CN | 109257956 A | 1/2019 |
| CN | 111641984 A | 9/2020 |
| EP | 3793256 A1 | 3/2021 |
| WO | 2012069352 A1 | 5/2012 |
| WO | 2019227350 A1 | 12/2019 |

OTHER PUBLICATIONS

International Search Report in the international application No. PCT/CN2021/087050, mailed on Jun. 24, 2021.
Written Opinion of the International Search Authority in the international application No. PCT/CN2021/087050, mailed on Jun. 24, 2021.
First Office Action of the Chinese application No. 202010468192.4, issued on Dec. 21, 2021.
Second Office Action of the Chinese application No. 202010468192.4, issued on Jun. 16, 2022.
Supplementary European Search Report in the European application No. 21814203.2, mailed on Nov. 6, 2023, 8 pages.

* cited by examiner

| Alternative behavior mode scheme A (Applicable dates: Monday to Friday) (Applicable weather: Sunny) | Static mode cell A1 | Dynamic mode cell A2 | ... | Dynamic mode cell A(N_A-1) | Group of the static mode cells AN_A ||| 
|---|---|---|---|---|---|---|---|
| | | | | | Static mode cell AN_{A1} | Static mode cell AN_{A2} | Static mode cell AN_{A3} |
| | Average historical camping duration RSRP of the cell (maximum value, minimum value and average value) RSRQ of the cell (maximum value, minimum value and average value) Best Beam Signal strength of adjacent cells | Average historical camping duration RSRP of the cell (maximum value, minimum value and average value) RSRQ of the cell (maximum value, minimum value and average value) Best Beam Signal strength of adjacent cells | ... | Average historical camping duration RSRP of the cell (maximum value, minimum value and average value) RSRQ of the cell (maximum value, minimum value and average value) Best Beam Signal strength of adjacent cells | Average historical camping duration RSRP of the cell (maximum value, minimum value and average value) RSRQ of the cell (maximum value, minimum value and average value) Best Beam Signal strength of adjacent cells | Average historical camping duration RSRP of the cell (maximum value, minimum value and average value) RSRQ of the cell (maximum value, minimum value and average value) Best Beam Signal strength of adjacent cells | Average historical camping duration RSRP of the cell (maximum value, minimum value and average value) RSRQ of the cell (maximum value, minimum value and average value) Best Beam Signal strength of adjacent cells |

FIG. 2A

| Alternative behavior mode scheme B (Applicable dates: Monday to Friday) (Applicable weather: rainy) | Static mode cell B1 | Dynamic mode cell B2 | ... | Dynamic mode cell B ($N_B$-1) | Static mode cell $BN_B$ |
|---|---|---|---|---|---|
| | Average historical camping duration<br>RSRP of the cell (maximum value, minimum value and average value)<br>RSRQ of the cell (maximum value, minimum value and average value)<br>Best Beam<br>Signal strength of adjacent cells | Average historical camping duration<br>RSRP of the cell (maximum value, minimum value and average value)<br>RSRQ of the cell (maximum value, minimum value and average value)<br>Best Beam<br>Signal strength of adjacent cells | ... | Average historical camping duration<br>RSRP of the cell (maximum value, minimum value and average value)<br>RSRQ of the cell (maximum value, minimum value and average value)<br>Best Beam<br>Signal strength of adjacent cells | Average historical camping duration<br>RSRP of the cell (maximum value, minimum value and average value)<br>RSRQ of the cell (maximum value, minimum value and average value)<br>Best Beam<br>Signal strength of adjacent cells |

FIG. 2B

| Alternative behavior mode scheme C (Applicable dates: Saturday) (Applicable weather: sunny) | Static mode cell C1 | Dynamic mode cell C2 | ... | Dynamic mode cell C ($N_C$-1) | Static mode cell $CN_C$ |
|---|---|---|---|---|---|
| | Average historical camping duration RSRP of the cell (maximum value, minimum value and average value) RSRQ of the cell (maximum value, minimum value and average value) Best Beam Signal strength of adjacent cells | Average historical camping duration RSRP of the cell (maximum value, minimum value and average value) RSRQ of the cell (maximum value, minimum value and average value) Best Beam Signal strength of adjacent cells | | Average historical camping duration RSRP of the cell (maximum value, minimum value and average value) RSRQ of the cell (maximum value, minimum value and average value) Best Beam Signal strength of adjacent cells | Average historical camping duration RSRP of the cell (maximum value, minimum value and average value) RSRQ of the cell (maximum value, minimum value and average value) Best Beam Signal strength of adjacent cells |

FIG. 2C

| Alternative behavior mode segment B (Applicable dates: null) (Applicable weather: null) | Dynamic mode cell B1 | Dynamic mode cell B2 | ... | Dynamic mode cell BM$_B$ |
|---|---|---|---|---|
| | Average historical camping duration RSRP of the cell (maximum value, minimum value and average value) RSRQ of the cell (maximum value, minimum value and average value) Best Beam Signal strength of adjacent cells | Average historical camping duration RSRP of the cell (maximum value, minimum value and average value) RSRQ of the cell (maximum value, minimum value and average value) Best Beam Signal strength of adjacent cells | | Average historical camping duration RSRP of the cell (maximum value, minimum value and average value) RSRQ of the cell (maximum value, minimum value and average value) Best Beam Signal strength of adjacent cells |

FIG. 4B

METHOD FOR PERFORMING CELL RESELECTION BASED ON BEHAVIOR MODE REFERENCE INFORMATION, TERMINAL AND STORAGE MEDIUM

CROSS-REFERENCE TO RELATED APPLICATIONS

This application is a continuation of International Application No. PCT/CN2021/087050 filed on Apr. 13, 2021, which claims priority to Chinese Patent Application No. 202010468192.4 filed on May 28, 2020, both of which are incorporated herein by reference in their entireties.

BACKGROUND

After a terminal is powered on, the terminal needs to select an appropriate cell according to an operator to which its Subscriber Identity Module (SIM) card belongs so as to camp on the cell, and establishes a Radio Resource Control (RRC) connection when there is a service demand.

After the terminal camps on a certain cell, the terminal can continuously compare signal quality of the current cell with signal quality of an adjacent cell, so as to determine whether a cell reselection is needed. On one hand, in a case where the terminal is in a mobile state, the signal of the current cell may be weakened. At this time, the terminal should reselect to a cell with better signal quality. On the other hand, in a case where the terminal is in an RRC connected state, if the signal of the current cell is weakened or even lost, the RRC connection re-establishment process will be triggered. At this time, the terminal also needs to perform cell searching to initiate an RRC connection reconstruction request to the network side after the terminal successfully camps on a cell.

At present, the terminal mainly selects a cell to camp on based on strength indexes of a signal of a cell, including: Reference Signal Receiving Power (RSRP) and Reference Signal Receiving Quality (RSRQ), and the speed and effect of cell selection are low.

SUMMARY

The embodiments of the present disclosure relates to the technical field of cell selection, and in particular, to a cell selection method, a terminal and a storage medium.

The embodiments of the present disclosure provide a cell selection method, a terminal and a storage medium, which can match the corresponding behavior mode scheme according to the actual handover scenario of the terminal, thereby providing a large amount of priori information for cell reselection by using the behavior mode scheme, and improving the speed and effect of cell selection.

The technical solutions of the embodiments of the present disclosure are implemented as follows.

The embodiments of the present disclosure provide a cell selection method including following operations: acquiring behavior mode reference information in a case where a first dynamic mode cell is reselected from a first static mode cell; searching, from among multiple alternative behavior mode schemes, a target behavior mode scheme matching with the first static mode cell, the first dynamic mode cell and the behavior mode reference information, where each of the multiple alternative behavior mode schemes records a respective cell handover process where a starting cell and an ending cell are cells in a static mode and a middle cell is a cell in a dynamic mode; and in a case where the target behavior mode scheme is searched out, performing, based on the first dynamic mode cell, the cell reselection by using the target behavior mode scheme.

The embodiments of the present disclosure provide a terminal including a processor, a memory storing processor-executable instructions, and a communication bus. The communication bus is configured to implement a communication connection between the processor and the memory. The processor is configured to execute the stored processor-executable instructions to perform operations of: acquiring behavior mode reference information in a case where a first dynamic mode cell is reselected from a first static mode cell; searching, from among a plurality of alternative behavior mode schemes, a target behavior mode scheme matching with the first static mode cell, the first dynamic mode cell and the behavior mode reference information, where each of the plurality of the alternative behavior mode schemes records a respective cell handover process where a starting cell and an ending cell are cells in a static mode and a middle cell is a cell in a dynamic mode; and in a case where the target behavior mode scheme is searched out, performing, based on the first dynamic mode cell, the cell reselection by using the target behavior mode scheme.

The embodiments of the present disclosure provide a non-transitory computer-readable storage medium having stored thereon processor-executable instructions that, when executed by a processor, cause the processor to perform operations of: acquiring behavior mode reference information in a case where a first dynamic mode cell is reselected from a first static mode cell; searching, from among a plurality of alternative behavior mode schemes, a target behavior mode scheme matching with the first static mode cell, the first dynamic mode cell and the behavior mode reference information, where each of the plurality of the alternative behavior mode schemes records a respective cell handover process where a starting cell and an ending cell are cells in a static mode and a middle cell is a cell in a dynamic mode; and in a case where the target behavior mode scheme is searched out, performing, based on the first dynamic mode cell, the cell reselection by using the target behavior mode scheme.

BRIEF DESCRIPTION OF THE DRAWINGS

FIG. 2A is a first schematic diagram of an exemplary alternative behavior mode scheme according to an embodiment of the present disclosure.

FIG. 2B is a second schematic diagram of an exemplary alternative behavior mode scheme according to an embodiment of the present disclosure.

FIG. 2C is a third schematic diagram 3 of an exemplary alternative behavior mode scheme according to an embodiment of the present disclosure.

FIG. 4B is a second schematic diagram of an exemplary alternative behavior mode segment according to an embodiment of the present disclosure.

DETAILED DESCRIPTION

In order to make the object, technical solutions and advantages of the present disclosure more clear, the present disclosure will be described in further detail below with reference to the accompanying drawings and embodiments. It should be understood that the specific embodiments described herein are intended to be explanatory only and are not intended to be limiting.

Figure 1:
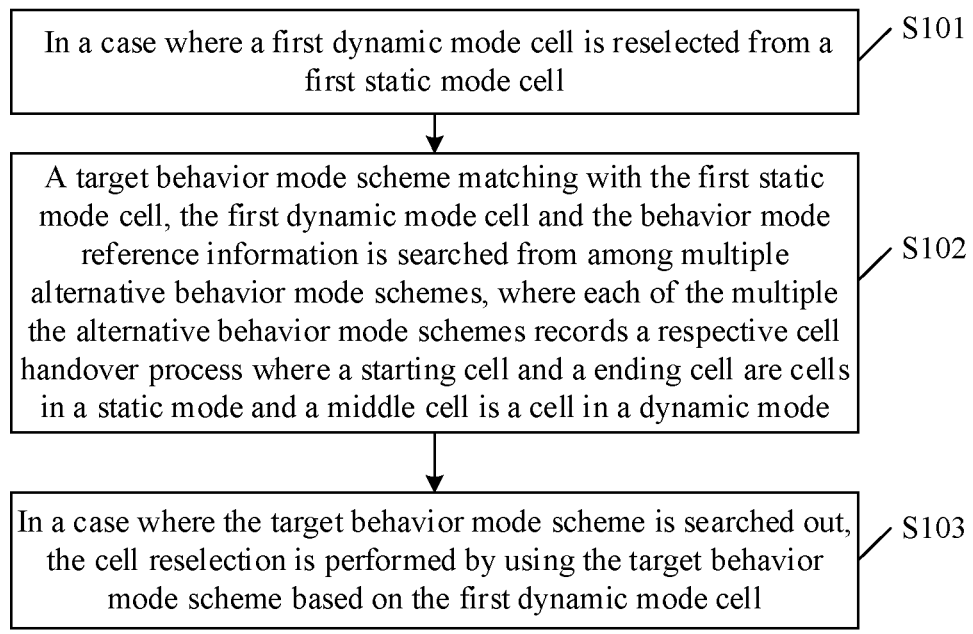
FIG. 1 is a first flowchart of a cell selection method according to an embodiment of the present disclosure.

The embodiments of the disclosure provide a cell selection method implemented by a terminal, and the terminal can be electronic devices such as a camera, a mobile phone, a tablet computer, which is not limited in the embodiments of the present disclosure. FIG. 1 is a first flowchart of a cell selection method according to an embodiment of the present disclosure. As shown in FIG. 1, the cell selection mainly includes operations S101 to S103.

In operation S101, in a case where a first dynamic mode cell is reselected from a first static mode cell, behavior mode reference information is acquired.

In an embodiment of the present disclosure, the terminal acquires the behavior mode reference information in a case where the first dynamic mode cell is reselected from the first static mode cell.

It is to be noted that in the embodiment of the present disclosure, the first static mode cell is a cell in a static mode, and the first dynamic mode cell is a cell in a dynamic mode. The cell in the static mode is a cell on which the terminal remains camping for a long time; and the cell in the dynamic mode is a cell on which the terminal remains camping for a short time, and the terminal often reselects to another cell quickly. The specific length of time for defining the cell in the static mode and the cell in the dynamic mode is not limited in the embodiments of the present disclosure.

It is to be noted that in the embodiment of the present disclosure, the terminal can acquire a large amount of historical cell handover information, so as to analyze whether each of different cells belongs to the cell in the static mode or the cell in the dynamic mode. For example, after the user gets home every day, his terminal usually camps on a specific cell for a long time, then the cell can be determined as the cell in the static mode; and when the user is on the way from home to the company, or from home to the school, the terminal usually reselects to another cell from one cell constantly and these cells can be determined as the cells in the dynamic mode.

It is to be noted that in the embodiment of the present disclosure, the behavior mode reference information acquired by the terminal includes but is not limited to: current date, time, weather, temperature and other objective factors that may affect the change of the behavior mode of the user. Specific behavior mode reference information can be acquired according to actual requirements, which is not limited in the embodiments of the present disclosure.

In operation S102, a target behavior mode scheme matching with the first static mode cell, the first dynamic mode cell and the behavior mode reference information is searched from among multiple alternative behavior mode schemes, where each of the multiple alternative behavior mode schemes records a respective cell handover process where a starting cell and an ending cell are cells in a static mode and a middle cell is a cell in a dynamic mode.

In the embodiment of the present disclosure, after the behavior mode reference information is acquired, the terminal further searches, from among the multiple alternative behavior mode schemes, a target behavior mode scheme matching with the first static mode cell, the first dynamic mode cell and the behavior mode reference information.

It is to be noted that in the embodiments of the present disclosure, the behavior mode of the terminal mainly includes two parts: one is the static mode, and the other is the dynamic mode. The static mode refers to a mode where a terminal camps on a cell on which the terminal will remain camping for a long time, or a mode where the terminal performs handover back and forth between several fixed adjacent cells. The dynamic mode refers to a mode where the terminal is in a mobile state and constantly reselects to another cell from one cell. Therefore, the behavior mode of the terminal can be summarized as: the terminal passes through one or more cells in the dynamic mode from the cell in the static mode, and finally camps on the cell in the static mode again. The multiple alternative behavior mode schemes are stored in the terminal and each of the multiple alternative behavior mode schemes records a respective cell handover process. In addition, each alternative behavior mode scheme further includes corresponding reference information, such as weather and date. The terminal can perform matching by using the first static mode cell, the first dynamic mode cell and the acquired behavior mode reference information, to search out a matching behavior mode scheme, and determine the searched-out behavior mode scheme as the target behavior mode scheme.

FIG. 2A to FIG. 2C are three exemplary alternative behavior mode schemes according to embodiments of the present disclosure. As shown in FIG. 2A to FIG. 2C, the applicable dates of alternative behavior mode scheme A and alternative behavior mode scheme B are Monday to Friday. The applicable date of the alternative behavior mode scheme C is Saturday. The applicable weather of the alternative behavior mode scheme A and the alternative behavior mode scheme C is sunny, and the applicable weather of the alternative behavior mode scheme B is rainy. Each behavior mode records a complete cell handover process. The terminal compares the first static mode cell, the first dynamic mode cell and the current weather and date included in the behavior mode reference information with multiple alternative behavior mode schemes, so that an alternative behavior mode scheme matching with the first static mode cell, the first dynamic mode cell and the current weather and date can be determined as the target behavior mode scheme.

It is to be noted that, in the embodiments of the present disclosure, as shown in FIG. 2A to FIG. 2C, for each alternative behavior mode scheme, the starting cell and the ending cell are both the cell in the static mode; and the link between the starting cell and the ending cell is composed of multiple cells in the dynamic mode, that is to say, the link represents that the terminal breaks away from the static mode from one place and moves to another place and then enters the static mode again. It is worth noting that the two cells in the static mode, i.e., the starting cell and the ending cell, can be the same cell or different cells, that is to say, the terminal returns to a same place again after leaving a certain place, or reaches a new place after leaving the place. In addition, in each alternative behavior mode scheme, except that the handover sequence between the cells is recorded, an average historical camping time, a maximum value, a minimum value and an average value of the RSRP index, a maximum value, a minimum value and an average value of the historical RSRQ index are also recorded for each cell. Furthermore, for a 5G cell, the best beam of the cell and signal strength of adjacent cells of the cell can also be recorded, so that the terminal can use such information to assist in cell reselection or optimize the alternative behavior mode scheme.

It is to be noted that, in the embodiments of the present disclosure, in the cell handover process recorded in the target behavior mode scheme, the starting cell is the first static mode cell, and the next cell following the starting cell is the first dynamic mode cell.

In operation S103, in a case where the target behavior mode scheme is searched out, the cell reselection is performed by using the target behavior mode scheme based on the first dynamic mode cell.

In the embodiment of the present disclosure, in a case where the target behavior mode scheme is searched out from among the multiple alternative behavior mode schemes, the terminal can perform cell reselection by using the target behavior mode scheme based on the first dynamic mode cell.

Specifically, in the embodiment of the present disclosure, the operation that the terminal performs cell reselection by using the target behavior mode scheme based on the first dynamic mode cell includes: a first target cell arranged behind the first dynamic mode cell and adjacent to the first dynamic mode cell is acquired from the target behavior mode scheme; in a case where it is measured that signal quality of the first target cell meets a preset signal quality condition, cell reselection optimization is performed to reselect to the first target cell; in a case where the first target cell is the cell in the dynamic mode, a second target cell arranged behind the first target cell and adjacent to the first target cell is continued to be acquired from the target behavior mode scheme to perform the cell reselection, until the signal quality of an acquired target cell does not meet the preset signal quality condition, or until the cell in the static mode is reselected; or, in a case where the first target cell is the cell in the static mode, the cell reselection is completed.

It can be appreciated that, in the embodiment of the present disclosure, the target behavior mode scheme includes the first dynamic mode cell. In the cell handover process recorded by the target behavior mode scheme, a cell to which the terminal switches from the first dynamic mode cell is the first target cell, that is to say, the first target cell is arranged behind the first dynamic mode cell and adjacent to the first dynamic mode cell. The specific first target cell is not limited in the embodiments of the disclosure.

It is to be noted that, in the embodiment of the present disclosure, after the first target cell is acquired, the terminal can measure the signal quality of the first target cell, so as to determine whether the signal quality of the first target cell meets the preset signal quality condition. For example, the terminal determines, through the measurement, that the signal quality of the first target cell is Q1, and Q1 is greater than the preset signal quality Q, and therefore the terminal determines that the signal quality of the first target cell meets the preset signal quality condition.

It is to be noted that, in the embodiment of the present disclosure, the operation that, in a case where the signal quality of the first target cell meets the preset signal quality condition, cell reselection optimization is performed to reselect to the first target cell, includes but not limited to: an access request is sent to the first target cell, i.e. the terminal reselects to the first target cell in advance, instead of initiating cell reselection until the signal quality of the current camping first dynamic mode cell drops to a certain degree; or the signal interfering with the cell is eliminated, and the priority of the first target cell among the currently searched cells is improved, etc. The specific cell reselection optimization manner can be selected according to actual situations, which is not limited in the embodiments of the present disclosure.

It is to be noted that, in the embodiment of the present disclosure, the terminal needs to determine the cell type of the first target cell after the terminal reselects to the first target cell. The final trend of the cell reselection is to select the cell in the static mode to remain camping on it for a long time. Therefore, if the first target cell is a cell in the dynamic mode, the terminal further acquires the next cell after the first target cell, that is, the second target cell, from the target behavior mode scheme, so as to continue to perform the cell reselection; and the above process is repeated continuously until the signal quality of the acquired target cell does not meet the preset signal quality condition, or the terminal reselects to the cell in the static mode. The operation that the terminal reselects to the cell in the static mode is actually the operation that the terminal reselects to the last cell in the target behavior mode scheme, and the last cell must be the cell in the static mode. If the first target cell is the cell in the static mode, the terminal will camp on the cell for a long time, thereby completing the cell reselection.

Figure 3:
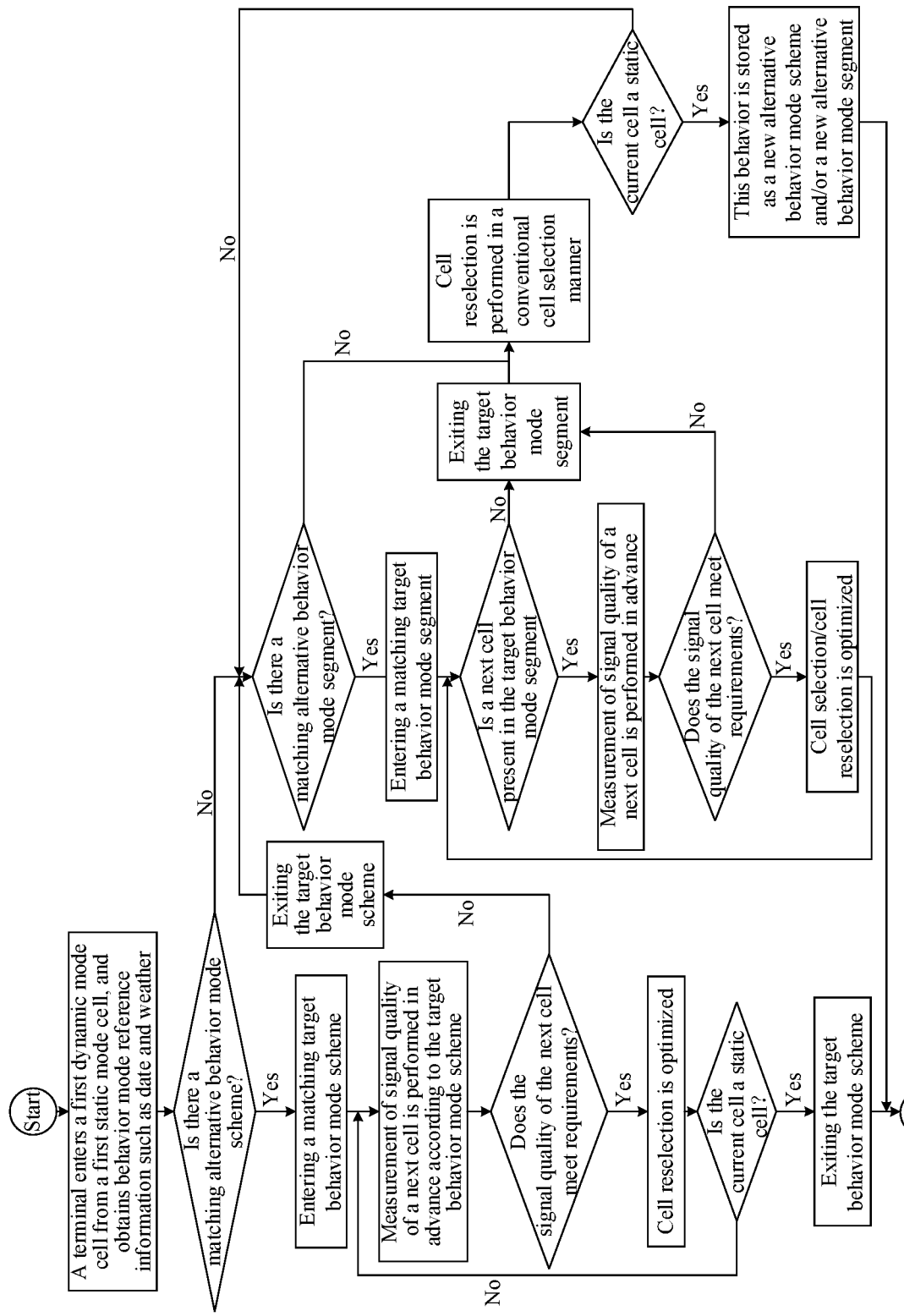
FIG. 3 is a second flowchart of a cell selection method according to an embodiment of the present disclosure.

FIG. 3 is a second flowchart of a cell selection method according to an embodiment of the present disclosure. As shown in FIG. 3, in a case where the terminal reselects to the first dynamic mode cell in the dynamic mode from the first dynamic mode cell in the static mode, if the target behavior mode scheme is searched out, the terminal can perform the cell reselection according to the above operation S103. Based on FIG. 3, the detailed description of the cell selection continues below.

In the embodiment of the present disclosure, in a case where the terminal does not search out the target behavior mode scheme, or in the cell reselection process performed by using the target behavior mode scheme, the signal quality of the acquired target cell does not meet a preset signal quality condition, the following operations can be performed. A target behavior mode segment matching with the first dynamic mode cell and the behavior mode reference information is searched from among multiple alternative behavior mode segments, where each of the multiple alternative behavior mode segments includes multiple cells in the dynamic mode arranged in sequence; in a case where the target behavior mode segment is searched out, the cell reselection is performed by using the target behavior mode segment based on the first dynamic mode cell; or, in a case where the target behavior mode segment is not searched out, the cell reselection is performed in a conventional cell selection manner until the cell in the static mode is reselected.

It can be appreciated that, in an embodiment of the present disclosure, as shown in FIG. 3, after operation S101, the terminal may not search out the target behavior mode scheme, and after operation S103, the signal quality of the target cell acquired by the terminal using the target behavior mode scheme may not meet the preset signal quality condition. For example, the signal quality of the acquired first target cell may not meet the preset signal quality condition. In both cases above, the terminal can acquire a target behavior mode segment matching with the first dynamic mode cell and the behavior mode reference information to perform the cell reselection by using the target behavior mode segment.

Figure 4A:
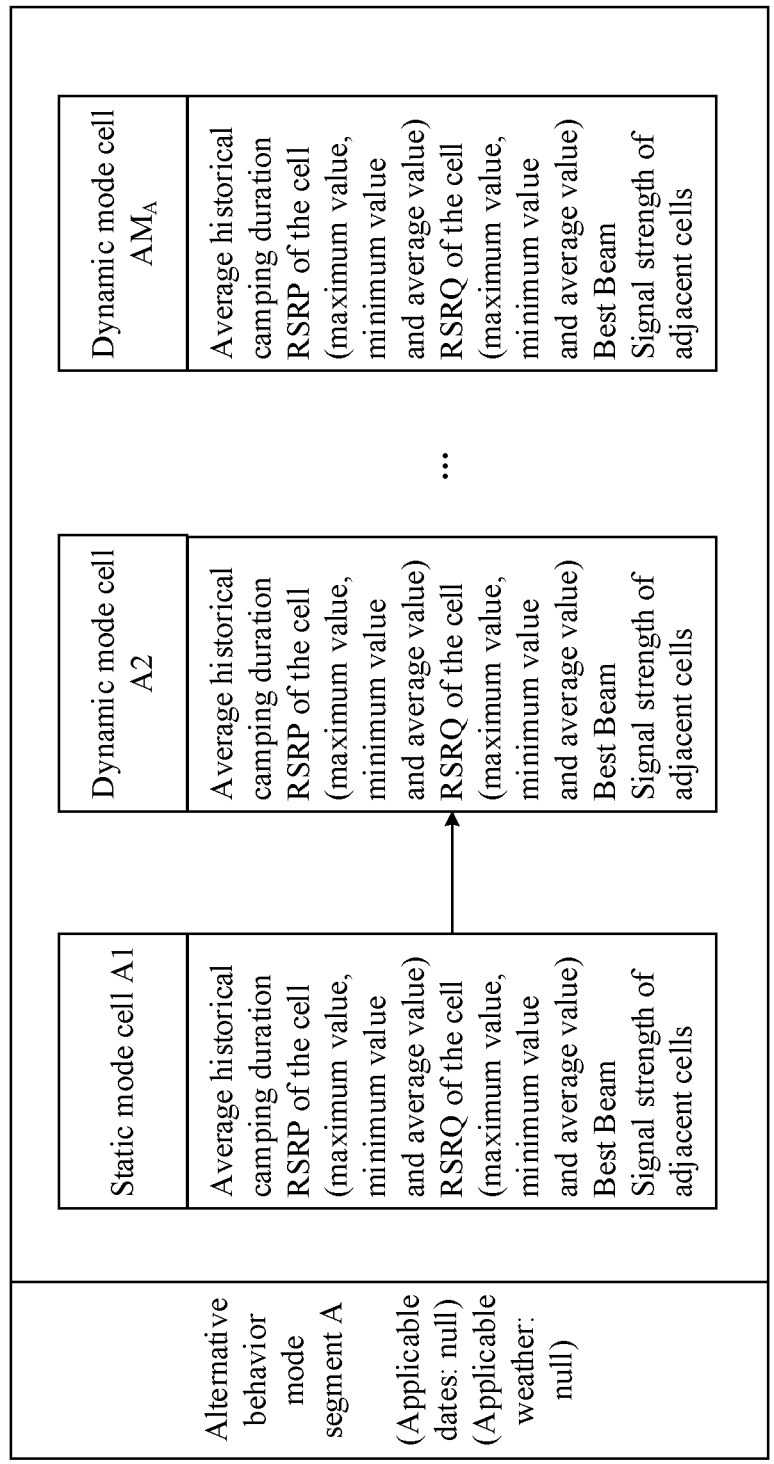
FIG. 4A is a first schematic diagram of an exemplary alternative behavior mode segment according to an embodiment of the present disclosure.

It is to be noted that in the embodiment of the present disclosure, multiple alternative behavior mode segments are stored in the terminal, and each segment includes multiple cells in the dynamic mode arranged in sequence. FIG. 4A and FIG. 4B are schematic diagrams of two exemplary alternative behavior mode segments according to embodiments of the present disclosure.

It can be understood that in the embodiment of the present disclosure, it is possible for the terminal to search out a matching target behavior mode segment from among multiple alternative behavior mode segments. At this time, the cell reselection can be performed by using the target behavior mode segment based on the first dynamic mode cell. Of course, as shown in FIG. 3, the terminal may not search out the target behavior mode segment from among the multiple alternative behavior mode segments. At this time, the terminal can perform the cell reselection in a conventional cell selection manner until the cell in the static mode is reselected.

In the embodiments of the present disclosure, the operation that the terminal performs cell reselection by using the target behavior mode segment based on the first dynamic mode cell includes: a first candidate cell arranged behind the first dynamic mode cell and adjacent to the first dynamic mode cell is acquired from the target behavior mode segment; in a case where the first candidate cell is acquired and signal quality of the first candidate cell meets the preset signal quality condition, cell reselection optimization is performed to reselect the first candidate cell; and a second candidate cell arranged behind the first candidate cell and adjacent to the first candidate cell is continued to be acquired from the target behavior mode segment, to perform the cell reselection, until signal quality of an acquired candidate cell does not meet the preset signal quality condition, or until all cells included in the target behavior mode segment have been reselected.

It can be appreciated that, in the embodiments of the present disclosure, similar to the operation of selecting the target cell from the target behavior mode scheme described above, the terminal can acquire the next cell behind the first dynamic mode cell from the target behavior mode segment as the first candidate cell, and perform cell reselection optimization in a case where signal quality of the first candidate cell meets the preset signal quality condition, so that the first candidate cell can be reselected. Since all the cells included in the target behavior mode segments are the dynamic cells, after the terminal reselects to the first candidate cell, it is necessary to continue acquiring the second candidate cell to continue performing the cell reselection until all the cells included in the target behavior mode segment have been reselected, i.e. the next cell cannot be acquired from the target behavior mode segment as a candidate cell, or the signal quality of the acquired candidate cell is poor. The terminal performs cell reselection optimization in the manner of reselection to the first candidate cell, which is the same as the reselection optimization in the manner of reselection to the first target cell. That is to say, such a manner includes: an access request is sent to the first candidate cell; or, among the currently searched cells, the priority of the first candidate cell is improved.

In the embodiments of the present disclosure, after the signal quality of the acquired candidate cell does not meet the preset signal quality condition or all cells included in the target behavior mode segment have been reselected, the terminal can also perform the operation of performing the cell reselection in the conventional cell selection manner until the static mode cell is reselected.

It can be appreciated that, in the embodiment of the present disclosure, as shown in FIG. 3, the terminal can actually turn to the conventional cell selection manner for cell reselection in three cases. The first case is that the target behavior mode segment is not searched out, the second case is that the signal quality of the acquired candidate cell does not meet the preset signal quality condition, and the third case is that all the cells included in the target behavior mode segment have been reselected, i.e., the candidate cell cannot be acquired from the target behavior mode segment.

It is to be noted that, in the embodiment of the present disclosure, the process that the terminal performs the cell reselection in the conventional cell selection manner is in fact a process that the terminal compares signal strength indexes of cells adjacent to the current camping cell, such as the RSRP and the RSRQ, so as to select the adjacent cell corresponding to the best strength index and perform the cell reselection. The specific conventional cell selection manner is the prior art, which will not be repeated herein.

In the embodiment of the present disclosure, as shown in FIG. 3, after the cell reselection is performed in the conventional cell selection manner until the cell in the static mode is reselected, the method further includes operations of determining the reselected cell in the static mode as a second static mode cell; and generating a new alternative behavior mode scheme and/or a new alternative behavior mode segment by using cell reselection behavior information by which the second static mode cell is reselected from the first static mode cell.

It can be appreciated that, in the embodiment of the present disclosure, each new cell handover process of the terminal may be recorded as a new alternative behavior mode scheme, thereby generating new alternative behavior mode schemes. In addition, the terminal can also extract a part of cells in the dynamic mode from the new alternative behavior mode schemes to form a cell chain, which is taken as a new alternative behavior mode segment.

It is to be noted that, in the embodiment of the present disclosure, multiple alternative behavior mode schemes and multiple alternative behavior mode segments need to be generated before the cell selection. The generation of the alternative behavior mode schemes and the alternative behavior mode segments will be described in detail below.

In the embodiments of the present disclosure, before the target behavior mode scheme matching with the first static mode cell, the first dynamic mode cell and the behavior mode reference information is searched from among the multiple alternative behavior mode schemes, i.e., the operation S102, the terminal performs the operations of acquiring historical cell handover information; generating multiple first behavior mode schemes by using the historical cell handover information; and determining each of the multiple first behavior mode schemes as one alternative behavior mode scheme, to obtain the multiple alternative behavior mode schemes.

It can be appreciated that in the embodiment of the present disclosure, the terminal can acquire the historical cell handover information, for example, all information about the process of after passing through multiple cells in the dynamic mode from a cell in a static mode by reselecting to the multiple cells, and finally camping on the cell in the static mode again, as shown in FIG. 2A to FIG. 2C, The terminal can analyze the historical cell handover information, for example, count the number of times of the cell handover manners indicated by duplicated historical cell handover information, so that the handover manner that has repeatedly occurred for many times is taken as an alternative behavior mode scheme. Specific historical cell handover information is not limited in the embodiment of the present disclosure.

In the embodiment of the present disclosure, after the multiple first behavior mode schemes are generated by using the historical cell handover information, the terminal can also performs the operations of extracting cell chains each composed of the cells in the dynamic mode from the multiple first behavior mode schemes to obtain multiple dynamic mode cell chains; and determining each of the multiple dynamic mode cell chains as one alternative behavior mode segment, to obtain multiple alternative behavior mode segments.

It can be appreciated that in the embodiment of the present disclosure, it is considered that the behavior of the terminal has rules to follow, and there is also certain randomness, Thus, the terminal may further extract cell chains, each composed of the cells in the dynamic mode, from the multiple first behavior mode schemes (for example, cell chains composed of the identical cells in the dynamic mode in different schemes, or the chains that has occurred many times and never changed in a same scheme), and store extracted cell chains as the alternative behavior mode segments. The introduction of the alternative behavior mode segments can identify the terminal behavior from a smaller granularity, thus further improving the feasibility of cell selection optimization. It is worth noting that the alternative behavior mode segment is completely composed of the cells in the dynamic mode, which corresponds to a mobile scenario with a relatively stable cell change rule, such as the movement of the terminal between subway stations, as shown in FIG. 4A and FIG. 4B.

It is to be noted that in the embodiment of the present disclosure, after the multiple first behavior mode schemes are generated by using the historical cell handover information, the terminal further performs the operations of performing optimization processing and/or fusion processing on the multiple first behavior mode schemes to obtain multiple second behavior mode schemes; and determining each of the multiple second behavior mode schemes as one alternative behavior mode scheme, to obtain the multiple alternative behavior mode schemes.

It is to be noted that, in the embodiment of the present disclosure, after the cell chains each composed of the cells in the dynamic mode are extracted from the multiple first behavior mode schemes, to obtain the multiple dynamic mode cell chains, the terminal further performs operations of performing optimization processing and/or fusion processing on the multiple dynamic mode cell chains to obtain multiple processed cell chains; and determining each of the multiple processed cell chains as one alternative behavior mode segment, to obtain the multiple alternative behavior mode segments.

Specifically, in the embodiment of the present disclosure, the operation that the terminal performs the optimization processing on the multiple first behavior mode schemes to obtain the multiple second behavior mode schemes includes: a group of cells meeting a preset reselection skipping condition is acquired from each of the multiple first behavior mode schemes to form a respective group of to-be-deleted cells, to obtain multiple groups of to-be-deleted cells; and a respective one of the multiple groups of to-be-deleted cells is deleted from each of the multiple first behavior mode schemes, to obtain the multiple second behavior mode schemes.

Figure 5:
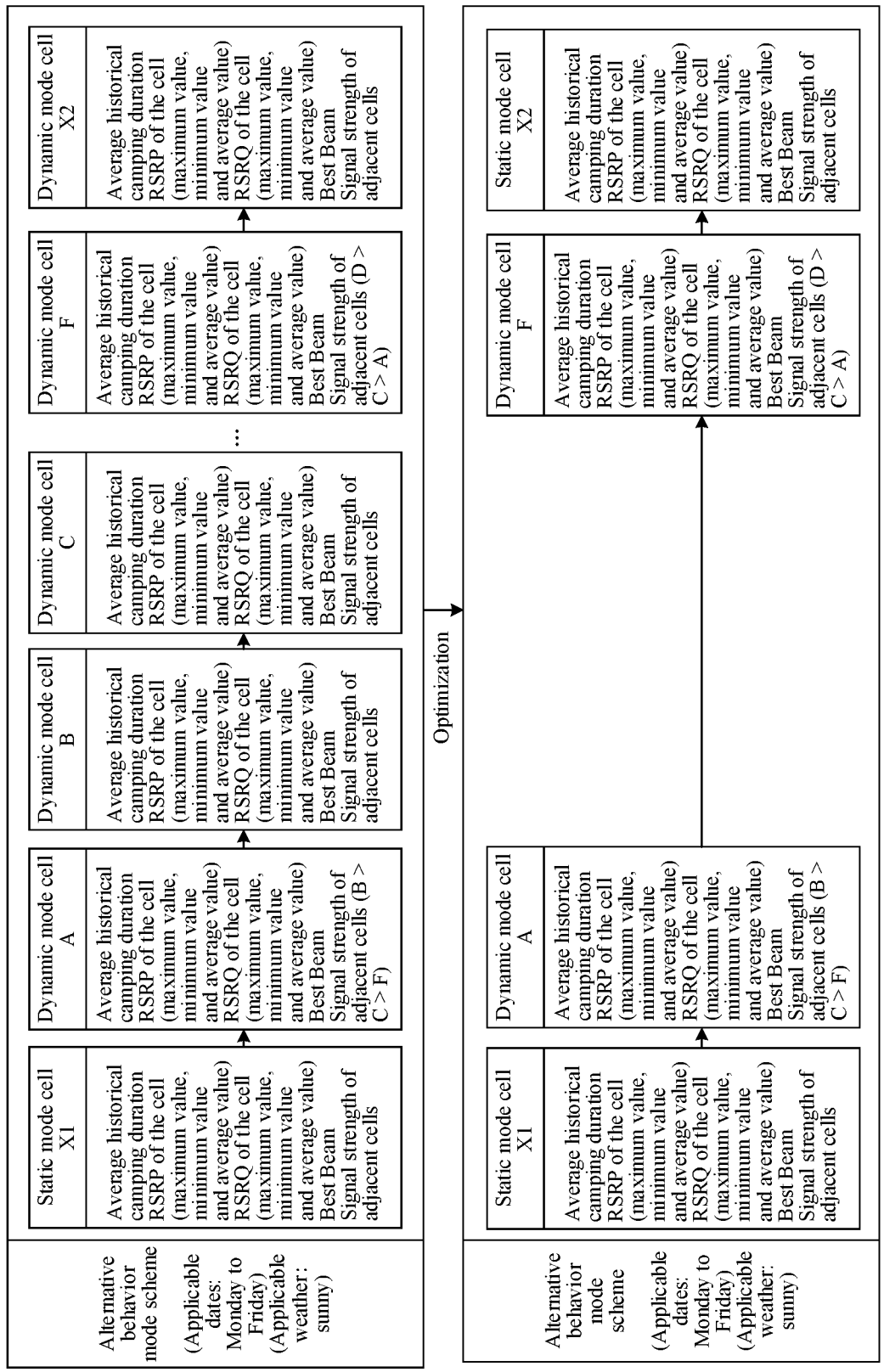
FIG. 5 is a schematic diagram of an exemplary optimized alternative behavior mode scheme according to an embodiment of the present disclosure.

It is to be noted that, in the embodiment of the present disclosure, since only the signal quality factor of the cell is considered for the generation of the first behavior mode scheme, each first behavior mode scheme per se can be optimized to some extent. Exemplarily, as shown in FIG. 5, the terminal camps on several consecutive cells in the dynamic mode for a very short time, resulting in too many times of cell reselection. That is to say, starting from the dynamic mode cell A, the terminal reselects to the dynamic mode cells B, C and D in turn and then to F. When the dynamic mode cell A is taken as the reference point, since the signal strength of dynamic mode cell B is the strongest, the dynamic mode cell B is reselected. If the signal of the dynamic mode cell F can also be searched out in the dynamic mode cell A, and quality of the signal meets the preset signal quality condition, the terminal can simplify the scheme as reselecting directly to the dynamic mode cell F from the dynamic mode cell A, thereby reducing the number of times of the reselection. Similarly, the terminal can optimize the dynamic mode cell chains in the same way.

Specifically, in the embodiment of the present disclosure, the operation that the terminal performs the fusion processing on the multiple first behavior mode schemes to obtain the multiple second behavior mode schemes includes: schemes having similarities with one another greater than a preset similarity among the multiple first behavior mode schemes are divided into a group of behavior mode schemes, to obtain multiple groups of behavior mode schemes; and each of the multiple groups of behavior mode schemes is merged into one second behavior mode scheme, to obtain the multiple second behavior mode schemes.

Figure 6:
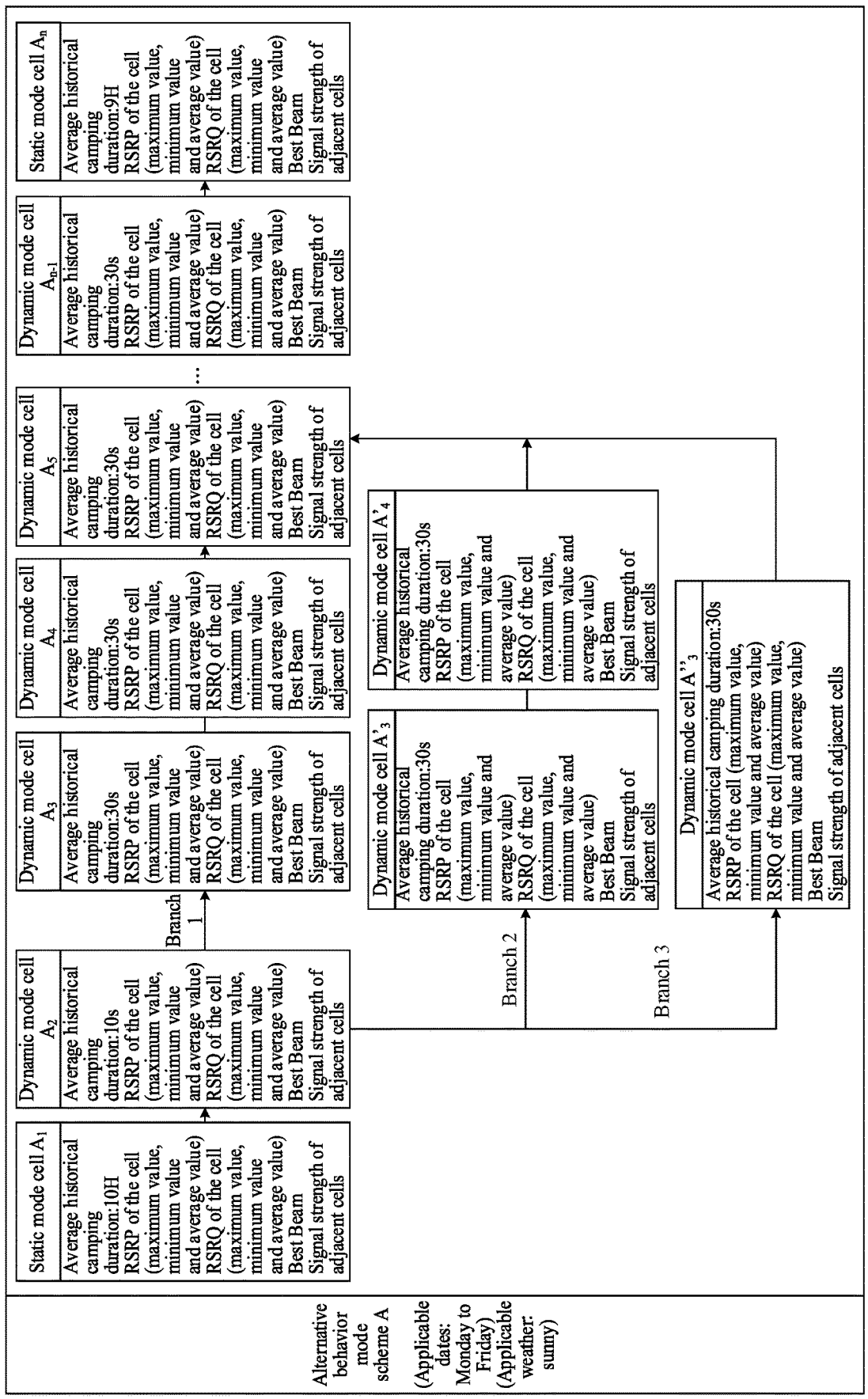
FIG. 6 is a schematic diagram of an exemplary fused alternative behavior mode scheme according to an embodiment of the present disclosure.

It is to be noted that, in the embodiments of the present disclosure, the terminal can also acquire mode schemes with a similarity from one another being greater than a preset similarity from among multiple first behavior mode schemes, for example, the schemes having the same starting cell and ending cell and partly different middle cells with one another, thus the concept of "branches" can be introduced. Similar behavior mode schemes are merged, and the merged second behavior mode scheme is determined as an alternative behavior mode scheme, as shown in FIG. 6. In this way, redundant information between similar schemes can be reduced and the flexibility of schemes can be improved. When the terminal uses the fused behavior mode scheme, it only needs to make further determination at the node where the branches are generated to select the appropriate branch. In addition, the terminal can configure a weight for each branch of the fused behavior mode scheme according to the number of times that the branch is reused, so that a branch with a larger weight can be preferentially selected in a case where multiple branches are appropriate for selection. Similarly, the terminal can also fuse the dynamic mode cell chains in the same way. The specific method for setting the preset similarity is not limited in the embodiments of the present disclosure.

It is to be noted that, in the embodiments of the present disclosure, the determination criteria for the cell in the static mode and the cell in the dynamic mode can have data samples optimized by using a big data manner, so as to improve the accuracy and flexibility of the behavior mode scheme. In addition, the alternative behavior mode schemes stored in the terminal can also be combined with the navigation software installed in the disclosure layer. When the user inputs a destination in the navigation software, the appropriate behavior mode scheme can be more accurately identified and used by using the inputted information.

The embodiments of the disclosure provides a cell selection method including: in a case where a first dynamic mode cell is reselected from a first static mode cell, behavior mode reference information is acquired; a target behavior mode scheme matching with the first static mode cell, the first dynamic mode cell and the behavior mode reference information is searched from among multiple alternative behavior mode schemes, where each of the multiple alternative behavior mode schemes records a respective cell handover process where a starting cell and an ending cell are cells in a static mode and a middle cell is a cell in a dynamic mode; and in a case where the target behavior mode scheme is searched out, the cell reselection is performed by using the target behavior mode scheme based on the first dynamic mode cell. In the technical solutions provided by the embodiments of the present disclosure, a corresponding behavior mode scheme can be matched according to the actual handover scenario of the terminal, thereby providing a large amount of priori information for cell reselection by using the behavior mode scheme, and improving the speed and effect of cell selection.

Figure 7:
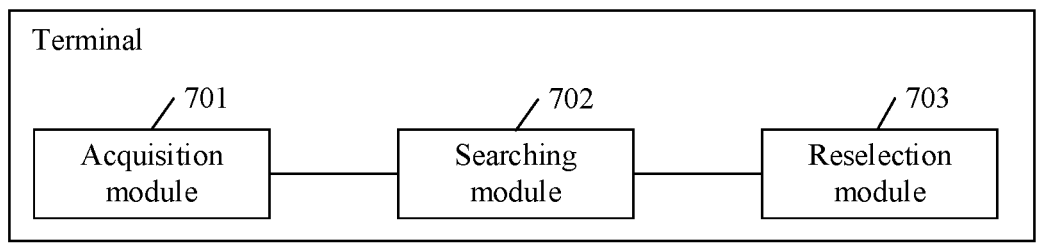
FIG. 7 is a first schematic structural diagram of a terminal according to an embodiment of the present disclosure.

The embodiments of the disclosure also provide a terminal. FIG. 7 is a schematic structural diagram of a terminal according to an embodiment of the present disclosure. As shown in FIG. 7, the terminal includes an acquisition module 701, a searching module 702 and a reselection module 703.

The acquisition module 701 is configured to acquire behavior mode reference information in a case where a first dynamic mode cell is reselected from a first static mode cell.

The searching module 702 is configured to search, from among multiple alternative behavior mode schemes, a target behavior mode scheme matching with the first static mode cell, the first dynamic mode cell and the behavior mode reference information, where each of the multiple alternative behavior mode schemes records a respective cell handover process.

The reselection module 703 is configured to perform, based on the first dynamic mode cell, the cell reselection by using the target behavior mode scheme in a case where the target behavior mode scheme is searched out.

In an embodiment of the present disclosure, the terminal further includes a processing module 704 (not shown in FIG. 7).

The acquisition module 701 is also configured to acquire historical cell handover information.

The processing module 704 is configured to generate multiple first behavior mode schemes by using the historical cell handover information; and determine each of the multiple first behavior mode schemes as one alternative behavior mode scheme, to obtain the multiple alternative behavior mode schemes.

In an embodiment of the present disclosure, the processing module 704 is also configured to perform optimization processing and/or fusion processing on the multiple first behavior mode schemes to obtain multiple second behavior mode schemes; and determine each of the multiple second behavior mode schemes as one alternative behavior mode scheme, to obtain the multiple alternative behavior mode schemes.

In an embodiment of the present disclosure, the processing module 704 is specifically configured to acquire a group of cells meeting a preset reselection skipping condition from each of the multiple first behavior mode schemes to form a respective group of to-be-deleted cells, to obtain multiple groups of to-be-deleted cells; and delete, from each of the multiple first behavior mode schemes, a respective one of the multiple groups of to-be-deleted cells, to obtain the multiple second behavior mode schemes.

In an embodiment of the present disclosure, the processing module 704 is specifically configured to divide schemes having similarities with one another greater than a preset similarity among the multiple first behavior mode schemes into a group of behavior mode schemes, to obtain multiple groups of behavior mode schemes; and merge each of the multiple groups of behavior mode schemes into one second behavior mode scheme, to obtain the multiple second behavior mode schemes.

In an embodiment of the present disclosure, the processing module 704 is further configured to extract cell chains each composed of cells in the dynamic mode from the multiple first behavior mode schemes to obtain multiple dynamic mode cell chains; and determine each of the multiple dynamic mode cell chains as one alternative behavior mode segment, to obtain multiple alternative behavior mode segments.

In an embodiment of the present disclosure, the processing module 704 is also configured to perform optimization processing and/or fusion processing on the multiple dynamic mode cell chains to obtain multiple processed cell chains; and determine each of the multiple processed cell chains as one alternative behavior mode segment, to obtain the multiple alternative behavior mode segments.

In an embodiment of the present disclosure, the reselection module 703 is specifically configured to acquire, from the target behavior mode scheme, a first target cell arranged behind the first dynamic mode cell and adjacent to the first dynamic mode cell; in a case where it is measured that signal quality of the first target cell meets a preset signal quality condition, perform cell reselection optimization to reselect to the first target cell; in a case where the first target cell is the cell in the dynamic mode, continue to acquire, from the target behavior mode scheme, a second target cell arranged behind the first target cell and adjacent to the first target cell to perform the cell reselection, until the signal quality of an acquired target cell does not meet the preset signal quality condition, or until the cell in the static mode is reselected; or, in a case where the first target cell is the cell in the static mode, complete the cell reselection.

In an embodiment of the present disclosure, the reselection module 703 is specifically configured to send an access request to the first target cell; or improve a priority of the first target cell in currently searched cells.

In an embodiment of the present disclosure, the reselection module 703 is further configured to, in a case where the searching module dose not search out the target behavior mode scheme or signal quality of a target cell acquired by the target behavior mode scheme does not meet a preset signal quality condition, search, from among multiple alternative behavior mode segments, a target behavior mode segment matching with the first dynamic mode cell and the behavior mode reference information, where each of the multiple alternative behavior mode segments includes multiple cells in the dynamic mode arranged in sequence; in a case where the target behavior mode segment is searched out, performing, based on the first dynamic mode cell, the cell reselection by using the target behavior mode segment; or, in a case where the target behavior mode segment is not searched out, performing the cell reselection in a conventional cell selection manner until the cell in the static mode is reselected.

In an embodiment of the present disclosure, the reselection module 703 is specifically configured to acquire, from the target behavior mode segment, a first candidate cell arranged behind the first dynamic mode cell and adjacent to the first dynamic mode cell; in a case where the first candidate cell is acquired and signal quality of the first candidate cell meets the preset signal quality condition, perform cell reselection optimization to reselect the first candidate cell; and continue to acquire, from the target behavior mode segment, a second candidate cell arranged behind the first candidate cell and adjacent to the first candidate cell to perform the cell reselection, until signal quality of an acquired candidate cell does not meet the preset signal quality condition, or until all cells included in the target behavior mode segment have been reselected.

In an embodiment of the present disclosure, the reselection module 703 is further configured to, after the signal quality of the acquired candidate cell does not meet the preset signal quality condition or all cells included in the target behavior mode segment have been reselected, perform the cell reselection in the conventional cell selection manner until the cell in the static mode is reselected.

In an embodiment of the present disclosure, the processing module 704 is further configured to determine the reselected cell in the static mode as a second static mode cell; and generate a new alternative behavior mode scheme and/or a new alternative behavior mode segment by using cell reselection behavior information by which the second static mode cell is reselected from the first static mode cell.

Figure 8:
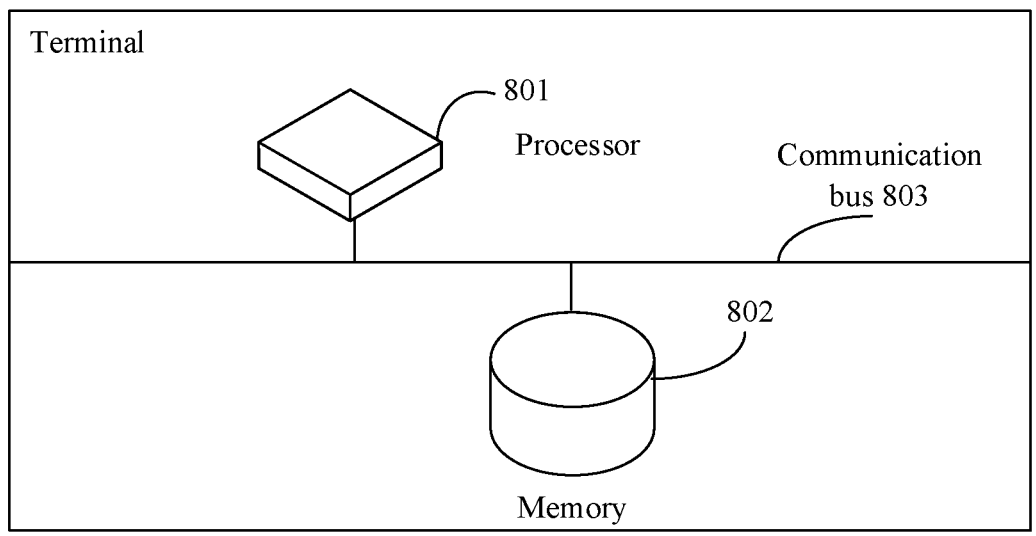
FIG. 8 is a second schematic structural diagram of a terminal according to an embodiment of the present disclosure.

FIG. 8 is a second schematic structural diagram a terminal according to an embodiment of the present disclosure. As shown in FIG. 8, the terminal includes a processor 801, a memory 802 and a communication bus 803.

The communication bus 803 is configured to implement a communication connection between the processor 801 and the memory 802.

The processor 801 is configured to execute cell selection programs stored in the memory 802 to perform the cell selection method.

The embodiments of the disclosure provide a terminal, configured to acquire behavior mode reference information in a case where a first dynamic mode cell is reselected from a first static mode cell; search, from among multiple alternative behavior mode schemes, a target behavior mode scheme matching with the first static mode cell, the first dynamic mode cell and the behavior mode reference information, where each of the multiple alternative behavior mode schemes records a respective cell handover process where a starting cell and an ending cell are cells in a static mode and a middle cell is a cell in a dynamic mode; and perform, based on the first dynamic mode cell, the cell reselection by using the target behavior mode scheme in a case where the target behavior mode scheme is searched out. The terminal provided by the embodiments of the disclosure can match the corresponding behavior mode scheme according to the actual handover scenario of the terminal, thereby providing a large amount of priori information for cell reselection by using the behavior mode scheme, and improving the speed and effect of cell selection.

The embodiments of the disclosure provide a computer-readable storage medium having stored thereon computer programs that, when executed by a processor, cause the processor to perform the cell selection method. The computer-readable storage medium may be volatile memory, such as Random-Access Memory (RAM); or non-volatile memory, such as Read-Only Memory (ROM), flash memory, hard disk drive (HDD) or Solid-State Drive (SSD); it may also be a respective device including one or any combination of the above memories such as a mobile phone, a computer, a tablet device, a personal digital assistant and the like.

Those skilled in the art will appreciate that embodiments of the present disclosure may be provided as methods systems or computer program products. Accordingly the disclosure may take the form of a hardware embodiment a software embodiment or an embodiment combining software and hardware aspects. Furthermore, the disclosure may take the form of a computer program product implemented on one or more computer-usable storage media (including, but not limited to, disk storage, optical storage, etc.) including computer-usable program code therein.

Each aspect of the embodiments of the present disclosure is described with reference to flowcharts and/or block diagrams of method, device (systems) and computer program product in according to the embodiments of the present disclosure. It is to be understood that each block in the flowcharts and/or block diagrams and a combination of each block in the flowcharts and/or block diagrams may be implemented by computer-readable program instructions. The present disclosure is described with reference to flowcharts and/or block diagrams of method, device (systems) and computer program product in according to the embodiments of the present disclosure. It is to be understood that each block in the flowcharts and/or block diagrams and a combination of each block in the flowcharts and/or block diagrams may be implemented by computer-readable program instructions. The computer-readable program instructions may be provided for a universal computer, a dedicated computer, an embedded processor or a processor of another programmable data processing device, thereby generating a machine to further generate a device that realizes a function/action specified in one or more blocks in the flowcharts and/or the block diagrams when the instructions are executed through the computer or the processor of the other programmable data processing device.

These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer program instructions may also be loaded onto a computer or other programmable data processing device, such that a series of operational steps are performed on a computer or other programmable device to produce a computer-implemented process, Thus, instructions executed on a computer or other programmable device provide steps for implementing the functions specified in the implementation of a flow diagram or flows and/or a block or blocks of a block diagram.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claim

INDUSTRIAL PRACTICALITY

The embodiments of the disclosure disclose a cell selection method, a device and a storage medium. The cell selection method includes: in a case where a first dynamic mode cell is reselected from a first static mode cell, behavior mode reference information is acquired; a target behavior mode scheme matching with the first static mode cell, the first dynamic mode cell and the behavior mode reference information is searched from among multiple alternative behavior mode schemes, where each of the multiple alternative behavior mode schemes records a respective cell handover process where a starting cell and an ending cell are cells in a static mode and a middle cell is a cell in a dynamic mode; and in a case where the target behavior mode scheme is searched out, the cell reselection is performed by using the target behavior mode scheme based on the first dynamic mode cell. In the technical solutions provided by the embodiments of the present disclosure, a corresponding behavior mode scheme can be matched according to the actual handover scenario of the terminal, thereby providing a large amount of priori information for cell reselection by using the behavior mode scheme, and improving the speed and effect of cell selection.

What is claimed is:

1. A cell selection method, comprising:
    acquiring behavior mode reference information in response to a first dynamic mode cell being reselected from a first static mode cell;
    searching, from among a plurality of alternative behavior mode schemes, a target behavior mode scheme matching with the first static mode cell, the first dynamic mode cell and the behavior mode reference information, wherein each of the plurality of the alternative behavior mode schemes records a respective cell handover process where a starting cell and an ending cell are cells in a static mode and a middle cell is a cell in a dynamic mode; and
    in response to the target behavior mode scheme being searched out, performing, based on the first dynamic mode cell, the cell reselection by using the target behavior mode scheme,
    wherein the method further comprises: before searching, from among the plurality of alternative behavior mode schemes, the target behavior mode scheme matching with the first static mode cell, the first dynamic mode cell and the behavior mode reference information,
    acquiring historical cell handover information;
    generating a plurality of first behavior mode schemes by using the historical cell handover information; and
    determining each of the plurality of the first behavior mode schemes as one alternative behavior mode scheme, to obtain the plurality of alternative behavior mode schemes,
    wherein the method further comprises: after generating the plurality of the first behavior mode schemes by using the historical cell handover information,
    performing at least one of optimization processing or fusion processing on the plurality of the first behavior mode schemes to obtain a plurality of second behavior mode schemes; and
    determining each of the plurality of the second behavior mode schemes as one alternative behavior mode scheme, to obtain the plurality of alternative behavior mode schemes.

2. The method of claim 1, wherein performing the optimization processing on the plurality of the first behavior mode schemes to obtain the plurality of the second behavior mode schemes comprises:
    acquiring a group of cells meeting a preset reselection skipping condition from each of the plurality of the first behavior mode schemes to form a respective group of to-be-deleted cells, to obtain a plurality of groups of to-be-deleted cells; and
    deleting, from each of the plurality of the first behavior mode schemes, a respective one of the plurality of groups of to-be-deleted cells, to obtain the plurality of the second behavior mode schemes.

3. The method of claim 1, wherein performing the fusion processing on the plurality of the first behavior mode schemes to obtain the plurality of the second behavior mode schemes comprises:
    dividing schemes having similarities with one another greater than a preset similarity among the plurality of first behavior mode schemes into a group of behavior mode schemes, to obtain a plurality of groups of behavior mode schemes; and
    merging each of the plurality of groups of behavior mode schemes into one second behavior mode scheme, to obtain the plurality of the second behavior mode schemes.

4. The method of claim 1, further comprising: after generating the plurality of the first behavior mode schemes by using the historical cell handover information,
    extracting cell chains each composed of cells in the dynamic mode from the plurality of the first behavior mode schemes to obtain a plurality of dynamic mode cell chains; and
    determining each of the plurality of dynamic mode cell chains as one alternative behavior mode segment, to obtain a plurality of alternative behavior mode segments.

5. The method of claim 2, further comprising: after extracting the cell chains each composed of the cells in the dynamic mode from the plurality of the first behavior mode schemes, to obtain the plurality of the dynamic mode cell chains,
    performing at least one of optimization processing or fusion processing on the plurality of the dynamic mode cell chains to obtain a plurality of processed cell chains; and
    determining each of the plurality of the processed cell chains as one alternative behavior mode segment, to obtain the plurality of the alternative behavior mode segments.

6. The method of claim 1, wherein performing, based on the first dynamic mode cell, the cell reselection by using the target behavior mode scheme comprises:
    acquiring, from the target behavior mode scheme, a first target cell arranged behind the first dynamic mode cell and adjacent to the first dynamic mode cell;
    in response to measuring that signal quality of the first target cell meets a preset signal quality condition, performing cell reselection optimization to reselect to the first target cell;
    in response to the first target cell being the cell in the dynamic mode, continuing to acquire, from the target behavior mode scheme, a second target cell arranged behind the first target cell and adjacent to the first target cell to perform the cell reselection, until the signal quality of an acquired target cell does not meet the preset signal quality condition, or until the cell in the static mode is reselected; or,
    in response to the first target cell being the cell in the static mode, completing the cell reselection.

7. The method of claim 6, wherein performing the cell reselection optimization to reselect to the first target cell comprises:

sending an access request to the first target cell; or
improving a priority of the first target cell in currently searched cells.

8. The method of claim 1, further comprising:
in response to the target behavior mode scheme being not searched out, or signal quality of a target cell acquired by the target behavior mode scheme not meeting a preset signal quality condition, searching, from among a plurality of alternative behavior mode segments, a target behavior mode segment matching with the first dynamic mode cell and the behavior mode reference information, wherein each of the plurality of the alternative behavior mode segments comprises a plurality of cells in the dynamic mode arranged in sequence;
in response to the target behavior mode segment being searched out, performing, based on the first dynamic mode cell, the cell reselection by using the target behavior mode segment; or,
in response to the target behavior mode segment being not searched out, performing the cell reselection in a conventional cell selection manner until the cell in the static mode is reselected.

9. The method of claim 8, wherein performing, based on the first dynamic mode cell, the cell reselection by using the target behavior mode segment comprises:
acquiring, from the target behavior mode segment, a first candidate cell arranged behind the first dynamic mode cell and adjacent to the first dynamic mode cell;
in response to the first candidate cell being acquired and signal quality of the first candidate cell meeting the preset signal quality condition, performing cell reselection optimization to reselect the first candidate cell; and
continuing to acquire, from the target behavior mode segment, a second candidate cell arranged behind the first candidate cell and adjacent to the first candidate cell to perform the cell reselection, until signal quality of an acquired candidate cell does not meet the preset signal quality condition, or until all cells comprised in the target behavior mode segment have been reselected.

10. The method of claim 9, further comprising: after the signal quality of the acquired candidate cell does not meet the preset signal quality condition or all cells comprised in the target behavior mode segment have been reselected,
performing the cell reselection in the conventional cell selection manner until the cell in the static mode is reselected.

11. The method of claim 8, further comprising: after performing the cell reselection in the conventional cell selection manner until the cell in the static mode is reselected,
determining the reselected cell in the static mode as a second static mode cell; and
generating at least one of a new alternative behavior mode scheme or a new alternative behavior mode segment by using cell reselection behavior information by which the second static mode cell is reselected from the first static mode cell.

12. A terminal, comprising: a processor, a memory storing processor-executable instructions, and a communication bus,
wherein the communication bus is configured to implement a communication connection between the processor and the memory; and
the processor is configured to execute the stored processor-executable instructions to perform operations of:
acquiring behavior mode reference information in response to a first dynamic mode cell being reselected from a first static mode cell;
searching, from among a plurality of alternative behavior mode schemes, a target behavior mode scheme matching with the first static mode cell, the first dynamic mode cell and the behavior mode reference information, wherein each of the plurality of the alternative behavior mode schemes records a respective cell handover process where a starting cell and an ending cell are cells in a static mode and a middle cell is a cell in a dynamic mode; and
in response to the target behavior mode scheme being searched out, performing, based on the first dynamic mode cell, the cell reselection by using the target behavior mode scheme,
wherein the processor is configured to execute the stored processor-executable instructions to perform further operations of: before searching, from among the plurality of alternative behavior mode schemes, the target behavior mode scheme matching with the first static mode cell, the first dynamic mode cell and the behavior mode reference information,
acquiring historical cell handover information;
generating a plurality of first behavior mode schemes by using the historical cell handover information; and
determining each of the plurality of the first behavior mode schemes as one alternative behavior mode scheme, to obtain the plurality of alternative behavior mode schemes,
wherein the processor is configured to execute the stored processor-executable instructions to perform further operations of: after generating the plurality of the first behavior mode schemes by using the historical cell handover information,
performing at least one of optimization processing or fusion processing on the plurality of the first behavior mode schemes to obtain a plurality of second behavior mode schemes; and
determining each of the plurality of the second behavior mode schemes as one alternative behavior mode scheme, to obtain the plurality of alternative behavior mode schemes.

13. The terminal of claim 12, wherein performing the optimization processing on the plurality of the first behavior mode schemes to obtain the plurality of the second behavior mode schemes comprises:
acquiring a group of cells meeting a preset reselection skipping condition from each of the plurality of the first behavior mode schemes to form a respective group of to-be-deleted cells, to obtain a plurality of groups of to-be-deleted cells; and
deleting, from each of the plurality of the first behavior mode schemes, a respective one of the plurality of groups of to-be-deleted cells, to obtain the plurality of the second behavior mode schemes.

14. The terminal of claim 12, wherein performing the fusion processing on the plurality of the first behavior mode schemes to obtain the plurality of the second behavior mode schemes comprises:
dividing schemes having similarities with one another greater than a preset similarity among the plurality of first behavior mode schemes into a group of behavior mode schemes, to obtain a plurality of groups of behavior mode schemes; and merging each of the plurality of groups of behavior mode schemes into one second behavior mode scheme, to obtain the plurality of the second behavior mode schemes.

15. The terminal of claim 12, wherein the processor is configured to execute the stored processor-executable instructions to perform further operations of: after generating the plurality of the first behavior mode schemes by using the historical cell handover information,
   extracting cell chains each composed of cells in the dynamic mode from the plurality of the first behavior mode schemes to obtain a plurality of dynamic mode cell chains; and
   determining each of the plurality of dynamic mode cell chains as one alternative behavior mode segment, to obtain a plurality of alternative behavior mode segments.

16. A non-transitory computer-readable storage medium having stored thereon processor-executable instructions that, when executed by a processor, cause the processor to perform operations of:
   acquiring behavior mode reference information in response to a first dynamic mode cell being reselected from a first static mode cell;
   searching, from among a plurality of alternative behavior mode schemes, a target behavior mode scheme matching with the first static mode cell, the first dynamic mode cell and the behavior mode reference information, wherein each of the plurality of the alternative behavior mode schemes records a respective cell handover process where a starting cell and an ending cell are cells in a static mode and a middle cell is a cell in a dynamic mode; and
   in response to the target behavior mode scheme being searched out, performing, based on the first dynamic mode cell, the cell reselection by using the target behavior mode scheme,
   wherein the processor is caused to further perform operations of: before searching, from among the plurality of alternative behavior mode schemes, the target behavior mode scheme matching with the first static mode cell, the first dynamic mode cell and the behavior mode reference information,
   acquiring historical cell handover information;
   generating a plurality of first behavior mode schemes by using the historical cell handover information; and
   determining each of the plurality of the first behavior mode schemes as one alternative behavior mode scheme, to obtain the plurality of alternative behavior mode schemes,
   wherein the processor is caused to further perform operations of: after generating the plurality of the first behavior mode schemes by using the historical cell handover information,
   performing at least one of optimization processing or fusion processing on the plurality of the first behavior mode schemes to obtain a plurality of second behavior mode schemes; and
   determining each of the plurality of the second behavior mode schemes as one alternative behavior mode scheme, to obtain the plurality of alternative behavior mode schemes.

17. The non-transitory computer-readable storage medium of claim 16, wherein performing the optimization processing on the plurality of the first behavior mode schemes to obtain the plurality of the second behavior mode schemes comprises:
   acquiring a group of cells meeting a preset reselection skipping condition from each of the plurality of the first behavior mode schemes to form a respective group of to-be-deleted cells, to obtain a plurality of groups of to-be-deleted cells; and
   deleting, from each of the plurality of the first behavior mode schemes, a respective one of the plurality of groups of to-be-deleted cells, to obtain the plurality of the second behavior mode schemes.

18. The non-transitory computer-readable storage medium of claim 16, wherein performing the fusion processing on the plurality of the first behavior mode schemes to obtain the plurality of the second behavior mode schemes comprises:
   dividing schemes having similarities with one another greater than a preset similarity among the plurality of first behavior mode schemes into a group of behavior mode schemes, to obtain a plurality of groups of behavior mode schemes; and
   merging each of the plurality of groups of behavior mode schemes into one second behavior mode scheme, to obtain the plurality of the second behavior mode schemes.

19. The non-transitory computer-readable storage medium of claim 16, wherein the processor is caused to further perform operations of: after generating the plurality of the first behavior mode schemes by using the historical cell handover information,
   extracting cell chains each composed of cells in the dynamic mode from the plurality of the first behavior mode schemes to obtain a plurality of dynamic mode cell chains; and
   determining each of the plurality of dynamic mode cell chains as one alternative behavior mode segment, to obtain a plurality of alternative behavior mode segments.

20. The non-transitory computer-readable storage medium of claim 19, wherein the processor is caused to further perform operations of: after extracting the cell chains each composed of the cells in the dynamic mode from the plurality of the first behavior mode schemes, to obtain the plurality of the dynamic mode cell chains,
   performing at least one of optimization processing or fusion processing on the plurality of the dynamic mode cell chains to obtain a plurality of processed cell chains; and
   determining each of the plurality of the processed cell chains as one alternative behavior mode segment, to obtain the plurality of the alternative behavior mode segments.

* * * * *